(12) United States Patent
Hao et al.

(10) Patent No.: US 11,396,748 B2
(45) Date of Patent: Jul. 26, 2022

(54) SPECIAL T-SHAPED COLUMN SHEAR WALL MODULE, SHEAR WALL AND CONSTRUCTION METHOD THEREOF

(71) Applicant: Xi'an University of Architecture and Technology, Shaanxi (CN)

(72) Inventors: Jiping Hao, Xi'an (CN); Qiang Xue, Xi'an (CN); Xiaoling Sun, Xi'an (CN); Liang Guo, Xi'an (CN); Hanchao Liu, Xi'an (CN)

(73) Assignee: XI'AN UNIVERSITY OF ARCHITECTURE AND TECHNOLOGY, Shaanxi (CN)

( * ) Notice: Subject to any disclaimer, the term of this patent is extended or adjusted under 35 U.S.C. 154(b) by 0 days.

(21) Appl. No.: 16/923,901

(22) Filed: Jul. 8, 2020

(65) Prior Publication Data

US 2021/0010267 A1 Jan. 14, 2021

(30) Foreign Application Priority Data

Jul. 9, 2019 (CN) .......................... 201910614091.0

(51) Int. Cl.
*E04B 2/86* (2006.01)
*E04B 2/56* (2006.01)
*E04B 2/68* (2006.01)

(52) U.S. Cl.
CPC ............ *E04B 2/8635* (2013.01); *E04B 2/562* (2013.01); *E04B 2/68* (2013.01); *E04B 2002/867* (2013.01)

(58) Field of Classification Search
CPC .......... E04B 2/8635; E04B 2/562; E04B 2/68; E04B 2002/867; E04B 2/8629; E04G 21/00
USPC ......... 52/326, 334, 338, 341, 424, 426–428, 52/435, 479, 481.1
See application file for complete search history.

(56) References Cited

U.S. PATENT DOCUMENTS

| 4,730,422 A * | 3/1988 | Young ...................... E04B 1/86 52/105 |
| 8,037,652 B2 * | 10/2011 | Marshall ............... E04B 2/8635 52/309.11 |
| 2013/0295318 A1 * | 11/2013 | Caboni ..................... E04B 2/84 428/99 |

* cited by examiner

*Primary Examiner* — Basil S Katcheves
*Assistant Examiner* — Omar F Hijaz
(74) *Attorney, Agent, or Firm* — Gregory M. Howison

(57) ABSTRACT

A T-shaped shear wall module including a straight pattern plate, two L-shaped pattern plates with a same structure, and connectors. Each of the two L-shaped pattern plates includes a first pattern plate and a second pattern plate which are perpendicular to each other. In a direction perpendicular to the straight pattern plate, the two first pattern plates are arranged in parallel to each other and both extend in a direction away from the straight pattern plate, and a plurality of connectors are rigidly arranged between two first pattern plates. Along a direction parallel to the straight pattern plate, two second pattern plates are coplanar and extend in opposite directions, and a plurality of connectors are rigidly arranged between the straight pattern plate and the two second pattern plates. The present application also provides a shear wall and a construction method thereof.

14 Claims, 10 Drawing Sheets

SPECIAL T-SHAPED COLUMN SHEAR WALL MODULE, SHEAR WALL AND CONSTRUCTION METHOD THEREOF

CROSS-REFERENCE TO RELATED APPLICATIONS

This application claims benefit to Chinese application no. 2019106140910, filed Jul. 9, 2019, the specification of which is incorporated herein by reference.

TECHNICAL FIELD

The present application relates to a building material, in particular to a special T-shaped column shear wall module, a shear wall and a construction method thereof.

BACKGROUND

A shear wall is mainly used to bear loads of a building or a structured house. Shear walls can be classified into a steel plate shear wall, a reinforced concrete shear wall and a reinforced block shear wall, etc., among which the reinforced concrete shear wall is the most commonly used. Along with the gradually upgrading national requirements for building energy conservation, the expanded polystyrene sheet (EPS) shear wall comes into use. The EPS shear wall refers to a composite wall formed by adhering insulation boards with thermal insulation functions, such as EPS boards or extruded plastic boards each with a certain strength and thickness, on an exterior wall. The EPS shear wall has advantages of thermal insulation, sound insulation, electric insulation and high construction speed. However, as for the existing T-shaped shear wall, a reinforced concrete concreting cavity at the corner has a smaller cross section, lower strength and poor supporting ability, which affects the firmness of the wall.

SUMMARY

In view of the problems of the existing T-shaped shear wall module that the reinforced concrete concreting cavity at the corner has a smaller cross section and a lower strength, which affects the firmness of the wall, the objective of the present application is to provide a special T-shaped column shear wall module, a shear wall and a construction method thereof.

A T-shaped shear wall module, including a straight pattern plate, two L-shaped pattern plates with a same structure, and connectors;

each of the two L-shaped pattern plates includes a first pattern plate and a second pattern plate perpendicular to each other;

in a direction perpendicular to the straight pattern plate, the two first pattern plates are arranged in parallel to each other and both extend in a direction away from the straight pattern plate, and a plurality of the connectors are rigidly arranged between the two first pattern plates;

along a direction parallel to the straight pattern plate, the two second pattern plates are coplanar and extend in opposite directions, and a plurality of the connectors are rigidly arranged between the straight pattern plate and the two second pattern plates;

a corner transition block is disposed at a corner of the L-shaped pattern plate; the corner transition block has a protruding surface protruding towards the straight pattern plate; an end of the protruding surface extends to an outer side surface of the first pattern plate; and another end of the protruding surface extends to an outer side surface of the second pattern plate.

In an embodiment, the protruding surface is an arc-shaped surface protruding towards the straight pattern plate.

In an embodiment, the corner transition block is in a shape of a right triangular prism, and the right triangular prism includes a first side surface and a second side surface perpendicular to each other; the first side surface is rigidly connected to the first pattern plate, and the second side surface is rigidly connected to the second pattern plate; the outer side surface of the first pattern plate and the first side surface are coplanar; and the outer side surface of the second pattern plate and the second side surface are coplanar.

In an embodiment, a side edge at an intersection between the first side surface and the second side surface is a rounded edge.

In an embodiment, a protruding block is provided on a top surface of the right triangular prism, and a groove matching the protruding block is disposed on a bottom of the right triangular prism.

In an embodiment, a first projecting part is provided on a top of the straight pattern plate; a plurality of first inner protrusions are arranged at intervals at an inner side of the first projecting part; a plurality of first outer protrusions are arranged at intervals at an outer side of the first projecting part;

a first groove matching the first projecting part, a plurality of first inner grooves matching the first inner protrusions, and a plurality of first outer grooves matching the first outer protrusions are disposed on a bottom of the straight pattern plate;

a height of the first projecting part is greater than a height of each of the first inner protrusions, and greater than a height of each of the first outer protrusions;

a second projecting part is provided on a top of the L-shaped pattern plate; a plurality of second inner protrusions are arranged at intervals at an inner side of the second projecting part; a plurality of second outer protrusions are arranged at intervals at an outer side of the second projecting part;

a second groove matching the second projecting part, a plurality of second inner grooves matching the second inner protrusions, and a plurality of second outer grooves matching the second outer protrusions are disposed on a bottom of each L-shaped pattern plate; and a height of the second projecting part is greater than a height of the second inner protrusions, and greater than a height of the second outer protrusions.

In an embodiment, the first inner protrusions and the first outer protrusions are arranged to be directly opposite one to one or staggered at two sides of the first projecting part; and the second inner protrusions and the second outer protrusions are arranged to be directly opposite one to one or staggered at two sides of the second projecting part.

In an embodiment, the first inner protrusions and the first outer protrusions are arranged to be directly opposite one to one, and have a same first height; and the second inner protrusions and the second outer protrusions are arranged to be directly opposite one to one, and have a same second height.

In an embodiment, a difference between the height of the first projecting part and the height of each of the first inner protrusions ranges from 3 mm to 6 mm, and a difference between the height of the second projecting part and the height of each of the second inner protrusions ranges from 3 mm to 6 mm.

In an embodiment, an interval between two adjacent first inner protrusions ranges from 55 mm to 65 mm, and an interval between two adjacent second inner protrusions ranges from 55 mm to 65 mm.

In an embodiment, cross sections of the first inner protrusions, the first outer protrusions, the second inner protrusions, and the second outer protrusion are all trapezoidal in shape, and edges in vertical direction of the first inner protrusions, the first outer protrusions, the second inner protrusions, and the second outer protrusions are all rounded edges.

In an embodiment, H1 denotes a distance between an inner side surface of the first projecting part and an inner surface of the straight pattern plate, and H2 denotes a distance between an outer side surface of the first projecting part and an outer surface of the straight pattern plate, H1<H2;

H3 denotes a distance between an inner side surface of the second projecting part and an inner side surface of the L-shaped pattern plate, and H4 denotes a distance between an outer side surface of the second projecting part and an outer side surface of the L-shaped pattern plate, H3<H4.

In an embodiment, H1 is in a range from 13 mm to 17 mm; H2 is in a range from 23 mm to 27 mm; H3 is in a range from 13 mm to 17 mm; and H4 is in a range from 23 mm to 27 mm.

In an embodiment, a third projecting part protruding outward is provided on an end surface of the straight pattern plate, and the third projecting part is trumpet-shaped; a third groove matching the third projecting part is disposed on another end surface of the straight pattern plate;

a fourth projecting part protruding outward is provided on an end surface of the L-shaped pattern plate; the fourth projecting part is trumpet-shaped; and a fourth groove matching the fourth projecting part is disposed on another end surface of the L-shaped pattern plate.

In an embodiment, a plurality of first dove-tail grooves are arranged at intervals on an inner surface and an outer surface of the straight pattern plate, and opening edges and inner edges of the first dove-tail grooves are all rounded edges;

a plurality of second dove-tail grooves are arranged at intervals on inner side surfaces and outer side surfaces of the two L-shaped pattern plates, and opening edges and inner edges of the second dove-tail grooves are all rounded edges.

In an embodiment, an inserting board is arranged in two oppositely disposed second dove-tail grooves among the second dove-tail grooves on the inner side surfaces of the two L-shaped pattern plates with the same structure, and the inserting board divides a concreting cavity enclosed by the two L-shaped pattern plates with the same structure into a concrete concreting cavity and a silt concreting cavity.

In an embodiment, the connectors each include a first connector and a second connector; the first connectors and the second connectors are spaced and alternately arranged between the two L-shaped pattern plates, and the first connectors and the second connectors are spaced and alternately arranged between the L-shaped pattern plates and the straight pattern plate; a height of the first connector in a vertical direction is greater than a height of the second connector in the vertical direction; and upper surfaces of the first connectors and the second connectors are located in a same horizontal plane, or lower surfaces of the first connectors and the second connectors are located in a same horizontal plane.

In an embodiment, the height of the first connector in the vertical direction is twice the height of the second connector in the vertical direction.

In an embodiment, the upper surfaces of the first connectors and the second connectors are located in the same horizontal plane; a plurality of receiving grooves are located on the upper surfaces of the first connectors and the second connectors; and a reinforcing bar is arranged in each of the receiving grooves.

In an embodiment, convex ribs protruding upwards are arranged at intervals on the upper surfaces of the first connectors and the second connectors, and each of the receiving grooves for receiving the reinforcing bar is formed between two adjacent convex ribs.

A shear wall includes a plurality of T-shaped shear wall modules described above, and the plurality of T-shaped shear wall modules are vertically spliced to form a whole shear wall.

A construction method of a building shear wall uses the T-shaped shear wall module described above, and includes steps of:

splicing a plurality of T-shaped shear wall modules vertically to form a concreting cavity;

pouring filler into the concreting cavity;

removing the corner transition block at the corner of the L-shaped pattern plate after the filler solidifies, and exposing a surface layer of the filler at the corner;

coating a coating layer on the exposed surface layer of the filler and outer surfaces of the first pattern plate and the second pattern plate.

The technical solutions of the embodiments above have at least following technical effects.

In the above T-shaped shear wall module, the corner transition block is disposed at the corner of the L-shaped pattern plate; the corner transition block has a protruding surface that protrudes toward the straight pattern plate; and one end of the protruding surface extends to the outer side surface of the first pattern plate, and the other end of the protruding surface extends to the outer side surface of the second pattern plate. The two protruding surfaces and the inner surface of the straight pattern plate jointly enclose the concreting cavity for pouring concrete, which effectively increases the cross-sectional area of the concreting cavity at the corners of the T-shaped shear wall module, improves the strength and the load-bearing capacity of the corners of the T-shaped shear wall module, and enhances the firmness of the wall. In addition, when the concrete in the concreting cavity has solidified, the corner transition blocks of the L-shaped pattern plate can be cut off. After the corner transition blocks are cut off, the corners of the two L-shaped pattern plates with the same structure are right-angled in shape, thereby guaranteeing the strength at the corners and reducing the occupied indoor space as well.

BRIEF DESCRIPTION OF THE DRAWINGS

The drawings constituting a part of the present application are used to provide a further understanding of the present application, and the exemplary embodiments and descriptions of the present application are used to explain the present application, but not constitute an improper limitation on the present application.

In order to describe the embodiments of the present disclosure more clearly, the drawings to be used in describing the embodiments will be briefly described. Obviously, the drawings to be described below are merely some embodiments of the present application. For those skilled in the art, other drawings may be obtained according to the drawings provided hereafter without any creative work.

DETAILED DESCRIPTION OF THE EMBODIMENTS

Figure 1:
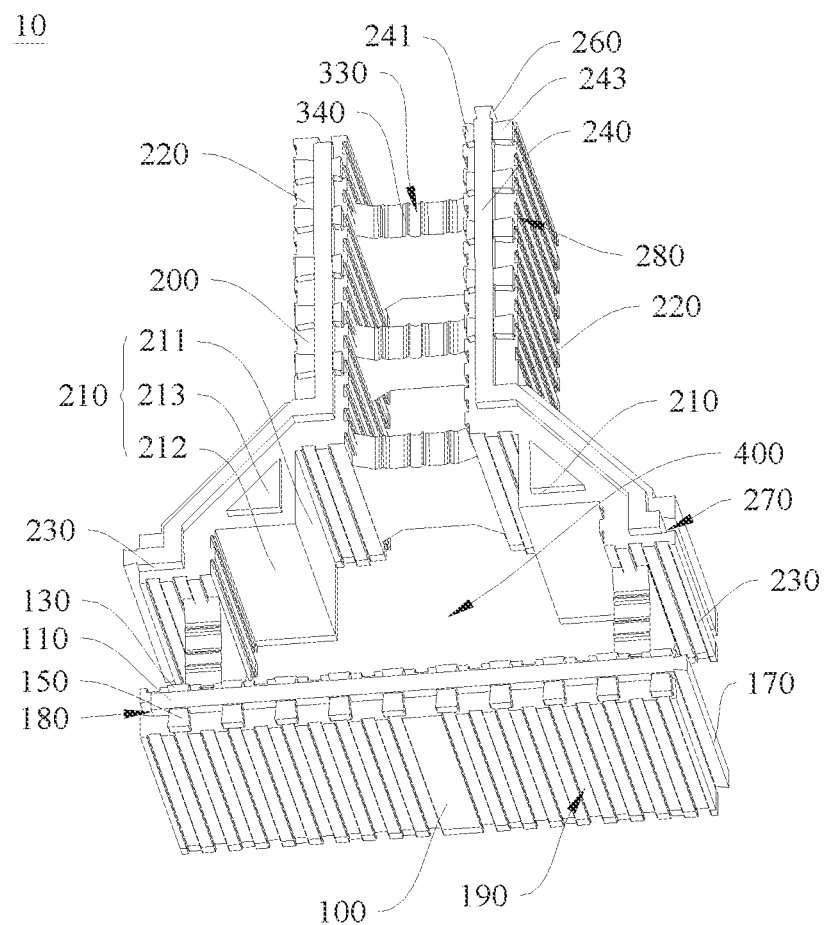
FIG. 1 is a schematic structure view of a first visual angle of a T-shaped shear wall module according to an embodiment of the present application.

In order to make the objective, technical solutions, and advantages of the present application clearer and understood, the technical solutions of the present application will be further described in detail below with reference to the accompanying drawings and embodiments. It should be understood that the specific embodiments described herein are only used to explain the technical solutions of the present application, but not intended to limit the technical solutions of the present application.

It should be noted that when an element is referred to as "fixed" to another element, it may be directly on another element or there may be an intermediate element therebetween. When an element is considered to be "connected" to another element, it can be directly connected to another element or there may be an intermediate element. In contrast, when an element is referred to as being "directly disposed" on another element, there are no intermediate elements. In contrast, when an element is referred to as being "directly" connected to another element, there are no intervening elements. The terms "vertical", "horizontal", "left", "right" and similar expressions used herein are for illustrative purposes only.

In the description of the present disclosure, it should be understood that terms such as "length", "width", "thickness", "upper", "lower", "front", "rear", "left", "right", "top", "bottom", "inner", "outer", should be referred to the orientation and positional relationship shown in the drawings, and are used only for the convenience of describing the present invention and simplifying the description, rather than indicating or implying that the referred devices or components must be arranged in such a specific direction or to be operated or configured in a specific direction. Therefore, the above mentioned terms cannot be understood as a limitation to the present application.

The technical solutions of the present application will be illustrated in more details below combining with the accompanying FIGS. 1 to 9.

Referring to FIG. 1, an embodiment of the present application provides a T-shaped shear wall module. The T-shaped shear wall module 10 includes a straight pattern plate 100, two L-shaped pattern plates 200 with the same structure, and connectors 300. Optionally, materials of the straight pattern plate 100, the two L-shaped pattern plates 200 with the same structure, and the connectors 300 are expanded polystyrene. Optionally, the straight pattern plate 100, the two L-shaped pattern plates 200 with the same structure, and the connector 300 are formed to be a whole by a mold box. Each of the L-shaped pattern plates 200 includes a first pattern plate 220 and a second pattern plate 230 which are perpendicular to each other. In a direction perpendicular to the straight pattern plate 100, the two first pattern plates 220 are arranged in parallel to each other and both extend in a direction away from the straight pattern plate 100, and a plurality of connectors 300 are rigidly arranged between the two first pattern plates 220. Along a direction parallel to the straight pattern plate 100, the two second pattern plates 230 are coplanar and extend in opposite directions, and a plurality of connectors 300 are rigidly arranged between the straight pattern plate 100 and the two second pattern plates 230. A corner transition block 210 is disposed at a corner of the L-shaped pattern plate 200. The corner transition block 210 has a protruding surface protruding toward the straight pattern plate 100; an end of the protruding surface extends to an outer side surface of the first pattern plate 220; and another end of the protruding surface extends to an outer side surface of the second pattern plate 230.

The protruding surfaces of the two corner transition blocks 210 of the two L-shaped pattern plates 200 and the inner surface of the straight pattern plate 100 jointly enclose a concreting cavity 400 at the corners for pouring reinforced concrete, which effectively increases the cross-sectional area of the concreting cavity 400 at the corners of the T-shaped shear wall module 10, improves the strength and load-bearing capacity of the corners of the T-shaped shear wall module, and enhances the firmness of the wall. In addition, when concrete in the concreting cavity has solidified, the two corner transition blocks 210 of the L-shaped pattern plate 200 can be cut off. After the two corner transition blocks 210 are cut off, the corners of the two L-shaped pattern plates are right-angled in shape, thereby guaranteeing the strength of the corners, and reducing occupied indoor space as well.

Optionally, the protruding surface is an arc-shaped curved surface protruding towards the straight pattern plate 100. One end of the arc-shaped curved surface extends to the outer side surface of the first pattern plate 220, and the other end of the arc-shaped curved surface extends to the outer side surface of the second pattern plate 230. The two arc-shaped curved surfaces and the straight pattern plate 100 jointly enclose the concreting cavity 400. The concreting cavity 400 has a relatively large cross-sectional area and a relatively good performance of bearing forces. After the concrete is poured into the concreting cavity 400, the two corner transition blocks 210 can be cut off, and the T-shaped shear wall module 10 can be used for constructing a buttress column directly, without providing a special buttress column pattern plate. Compared with the existing buttress column, the buttress column built by the T-shaped shear wall module 10 occupies less indoor space.

Specifically, as shown in FIG. 1, the two L-shaped pattern plates 200 have the same structure and are arranged to be opposite to each other. The two L-shaped pattern plates 200 each include the first pattern plate 220 and the second pattern plate 230 which are perpendicular to each other. The cross section of the corner transition block 210 can be triangular, arc-shaped, semi-circular in shape, or the like. In an embodiment, the corner transition block 210 is in a shape of a right triangular prism, and the right triangular prism includes a first side surface 211 and a second side surface 212 which are perpendicular to each other. The first side surface 211 is rigidly connected to the first pattern plate 220, and the second side surface 212 is rigidly connected to the second pattern plate 230. The outer side surface of the first pattern plate 220 and the first side surface 211 are coplanar; that is, in a direction perpendicular to the first pattern plate 220, the L-shaped pattern plate 200 retracts inwards at the corner, and the retracted depth is equal to a thickness of the first pattern plate 220. The outer side surface of the second pattern plate 230 and the second side surface 212 are coplanar; that is, in a direction perpendicular to the second pattern plate 230, the L-shaped pattern plate 200 retracts inwards at the corner, and the retracted depth is equal to a thickness of the second pattern plate 230. The first side surface 211, the second side surface 212, one end surface of the first pattern plate 220, one end surface of the second pattern plate 230, and the straight pattern plate 100 jointly enclose the concreting cavity 400. The concreting cavity 400 has a relatively large cross-sectional area and relatively good performance of bearing forces. After concrete is poured into the concreting cavity 400, the two corner transition blocks 210 can be cut off, and the T-shaped shear wall module 10 can be used for constructing a buttress column directly, without providing a special buttress column pattern plate. Compared with the existing buttress column, the buttress column built by the T-shaped shear wall module 10 occupies less indoor space. The cross-sectional area of the concreting cavity 400 at the corners of the T-shaped shear wall module is effectively increased, thereby improving the strength and the load-bearing capacity of the corners of the T-shaped shear wall module, and enhancing the firmness of the wall. In addition, when the concrete in the concreting cavity has solidified, the corner transition block 210 can be cut off. After the corner transition block 210 is cut off, the corner of the L-shaped pattern plate is right-angled in shape, thereby guaranteeing the strength of the corner, and reducing the occupied indoor space as well.

Optionally, a side edge at an intersection between the first side surface 211 and the second side surface 212 is a rounded edge, thereby effectively reducing the stress concentration at the corner of the T-shaped shear wall module, improving the strength and load-bearing capacity of the corners of the T-shaped shear wall module, and enhancing the firmness of the wall.

Figure 2:
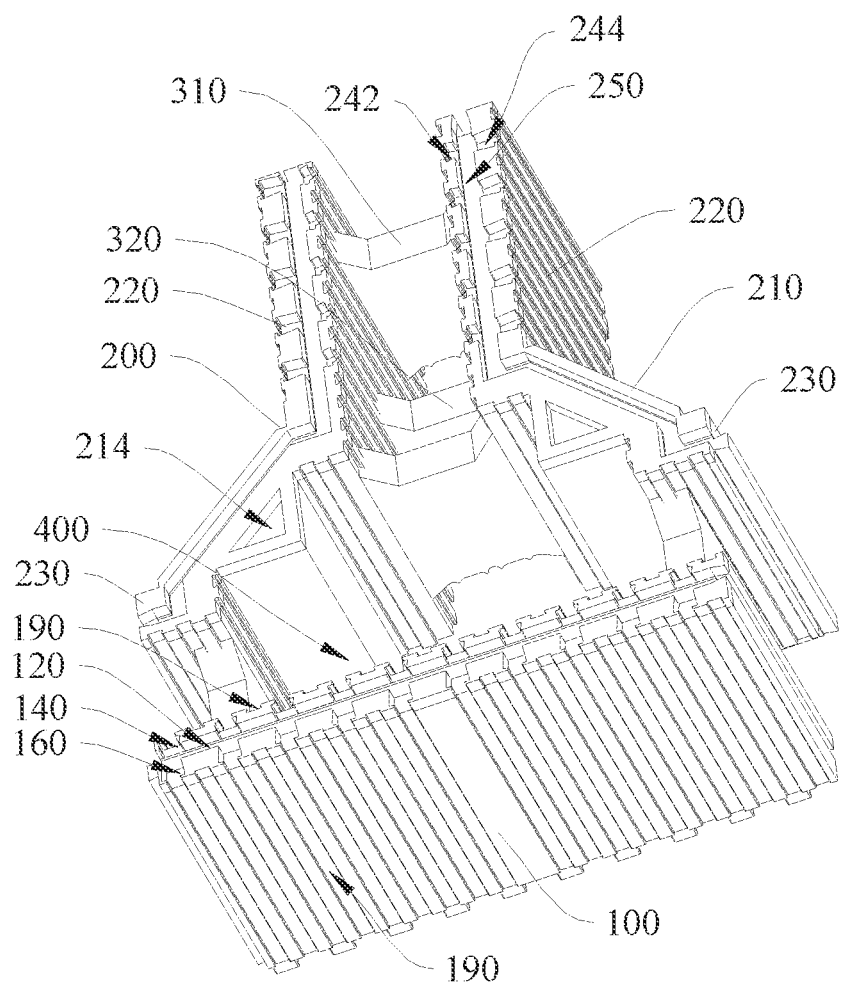
FIG. 2 is a schematic structure view of a second visual angle of the T-shaped shear wall module according to an embodiment of the present application.

Optionally, as shown in FIGS. 1 and 2, a protruding block 213 is provided on the top surface of the triangular prism, and the protruding block 213 can be triangular, trapezoidal, circular, oval in shape, or the like. In an embodiment, the protruding block 213 is triangular in shape, and a groove 214 matching the protruding block 213 is disposed on the bottom of the triangular prism. When two adjacent upper and lower T-shaped shear wall modules 10 are vertically spliced, the protruding block 213 and the groove 214 fit together to achieve accurate positioning and installation.

Figure 3:
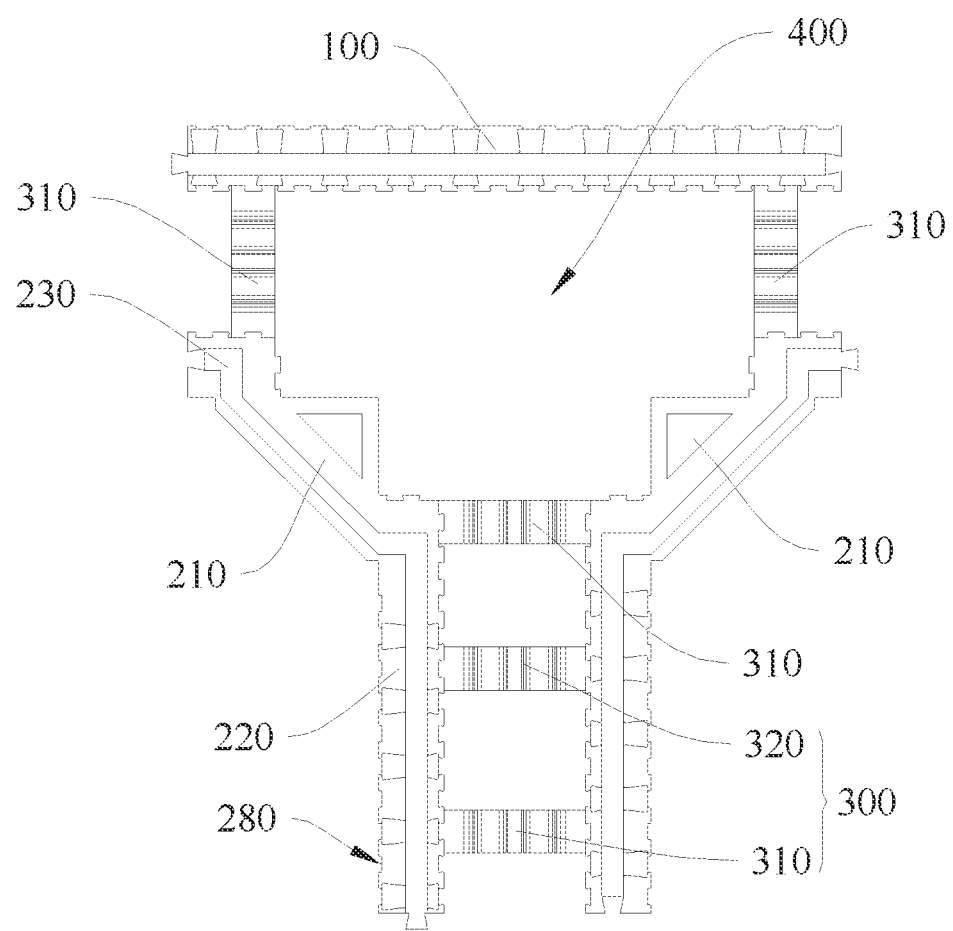
FIG. 3 is a top view of the T-shaped shear wall module according to an embodiment of the present application.

Referring to FIGS. 1 to 3, optionally, a first projecting part 110 is provided on the top of the straight pattern plate 100; a plurality of first inner protrusions 130 are arranged at intervals at the inner side of the first projecting part 110; and a plurality of first outer protrusions 150 are arranged at intervals at the outer side of the first projecting part 110. As shown in FIG. 1, a height of the first projecting part 110 is greater than a height of each of the first inner protrusions 130, and the height of the first projecting part 110 is greater than a height of each of the first outer protrusions 150. As shown in FIG. 2, the bottom of the straight pattern plate 100 is provided with a first groove 120 matching the first projecting part 110; the bottom of the straight pattern plate 100 is provided with first inner grooves 140 matching the first inner protrusions 130; and the bottom of the straight pattern plate 100 is provided with first outer grooves 160 matching the first outer protrusions 150. As shown in FIG. 1, the top of the L-shaped pattern plate 200 is provided with a second projecting part 240; a plurality of second inner protrusions 241 are arranged at intervals at the inner side of the second projecting part 240; a plurality of second outer protrusions 243 are arranged at intervals at the outer side of the second projecting part 240; a height of the second projecting part 240 is greater than a height of each of the second inner protrusions 241; and the height of the second projecting part 240 is greater than a height of each of the second outer protrusions 243. As shown in FIG. 2, the bottom of each of the two L-shaped pattern plates 200 with the same structure is provided with a second groove 250 matching the second projecting part 240; the bottom of the L-shaped pattern plate 200 is provided with second inner grooves 242 matching the second inner protrusions 241; and the bottom of the L-shaped pattern plate 200 are provided with second outer grooves 244 matching the second outer protrusions 243. When one T-shaped shear wall module 10 is vertically spliced together with another T-shaped shear wall module 10, the first projecting part 110, the first inner protrusions 130, the first outer protrusions 150 provided on the top of the straight pattern plate 100 of the first T-shaped shear wall module 10 fit and are installed correspondingly in the first groove 120, the first inner grooves 140, and the first outer grooves 160 provided on the bottom of the straight pattern plate 100 of the second T-shaped shear wall module 10, respectively. Meanwhile, the second projecting parts 240, the second inner protrusions 241 and the second outer protrusions 243 provided on the tops of the two L-shaped pattern plates 200 of the first T-shaped shear wall module 10 fit and are installed correspondingly in the second groove 250, the second inner grooves 242, and the second outer grooves 244 provided on the bottoms of the two L-shaped pattern plates 200 of the second T-shaped shear wall module 10, respectively. Moreover, the height of the first projecting part 110 is greater than the height of each of the first inner protrusions 130; the height of the first projecting part 110 is greater than the height of each of the first outer protrusions 150; the height of the second projecting part 240 is greater than the height of each of the second inner protrusions 241; and the height of the second projecting part 240 is greater than the height of each of the second outer protrusions 243. Accordingly, the internal concrete can be effectively prevented from pouring out through a gap between the two spliced T-shaped shear wall modules, thus avoiding a water loss of the concrete, ensuring a normal proportion of water in the concrete, and further ensuring the strength of the wall after the concrete has solidified. Besides, since the water loss of the concrete is avoided, the water in the concrete plays a role in curing the concrete, thus enabling the newly poured concrete to solidify at a normal rate or at an increased rate, and enhancing the strength of the wall. In addition, the water in the concrete is prevented from flowing out through the gap between the two spliced shear wall modules 100, thus guaranteeing the cleanliness of the wall and making the wall more beautiful, effectively avoiding a fracture of the connector 300 and preventing a swelled portion from occurring between the two spliced upper and lower T-shaped shear wall modules 10, improving the construction progress, and enhancing the firmness of the wall.

Optionally, the first inner protrusions 130 and the first outer protrusions 150 are arranged to be directly opposite one to one or staggered at two sides of the first projecting part 110, and the second inner protrusions 241 and the second outer protrusions 243 are arranged to be directly opposite one to one or staggered at two sides of the second projecting part 240, so that integration of insertion and positioning is achieved, and that special positioning steps are omitted, and that the insertion of the two adjacent upper and lower T-shaped shear wall modules 10 is more firm, avoiding a separation between modules when concrete is being poured.

Optionally, as shown in FIG. 1, the first inner protrusions 130 and the first outer protrusions 150 are arranged to be directly opposite one to one, and have the same height; and the second inner protrusions 241 and the second second outer protrusions 243 are arranged to be directly opposite one to one, and have the same height. Such an arrangement is convenient for mold stripping and molding. A difference between the height of the first projecting part 110 and the height of the first inner protrusion 130 ranges from 3 mm to 6 mm, and a difference between the height of the second projecting part 240 and the height of the second inner protrusion 241 ranges from 3 mm to 6 mm. Optionally, an interval between two adjacent first inner protrusions 130 ranges from 55 mm to 65 mm, and an interval between two adjacent second inner protrusions 241 ranges from 55 mm to 65 mm. The first inner protrusions 130 and the two adjacent second inner protrusions 241 are densely arranged. When one T-shaped shear wall module 10 and another T-shaped shear wall module 10 are spliced vertically, the contact area of insertion is large, thus effectively preventing the internal concrete from flowing out through the gap between two upper and lower T-shaped shear wall modules 10, avoiding the fracture of the connector 300 and prevent a swelled portion from occurring between the spliced two upper and lower T-shaped shear wall modules 10, improving the construction progress, and enhancing the firmness of the wall.

Optionally, referring to FIGS. 1 and 3, the cross sections of the first inner protrusion 130, the first outer protrusion 150, the second inner protrusion 241, and the second outer protrusion 243 are all trapezoidal in shape. In a vertical direction, the edges of the first inner protrusion 130, the first outer protrusion 150, the second inner protrusion 241, and the second outer protrusion 243 are all rounded edges. The two adjacent upper and lower T-shaped shear wall modules 10 have relatively high connection strength and rigidity after they are inserted one to another, which can effectively prevent the upper and lower modules from being separated from each other when the concrete is being poured, and can further prevent the concrete from flowing out through the gap and causing the fracture of the connectors 300 due to excessive forces exerted on two sides of the connectors 300. The T-shaped shear wall module 10 is prevented from being damaged due to the collisions of sharp corners during transportation.

Optionally, referring to FIGS. 1 and 3, H1 denotes a distance between the inner side surface of the first projecting part 110 and the inner surface of the straight pattern plate 100, and H2 denotes a distance between the outer side surface of the first projecting part 110 and the outer surface of the straight pattern plate 100, where H1<H2. H3 denotes a distance between the inner side surface of the second projecting part 240 and the inner side surface of the L-shaped pattern plate 200, and H4 denotes a distance between the outer side surface of the second projecting part 240 and the outer side surface of the L-shaped pattern plate 200, where H3<H4. H1 is in a range from 13 mm to 17 mm; H2 is in a range from 23 mm to 27 mm; t H3 is in a range from 13 mm to 17 mm; and H4 is in a range from 23 mm to 27 mm. H1<H2, and H3<H4, which can reduce the impact of the concrete on the module when the concrete is being poured, and effectively prevent the fracture of the connectors 300.

Optionally, referring to FIGS. 1 to 3, a third projecting part 170 protruding outward is provided on an end surface of the straight pattern plate 100, and a cross section of the third projecting part 170 is trumpet-shaped. A third groove 180 matching the third projecting part 170 is disposed on another end surface of the straight pattern plate 100. An end surface of the L-shaped pattern plate 200 is provided with a fourth projecting part 260 protruding outward. A cross section of the fourth projecting part 260 is trumpet-shaped. A fourth groove 270 matching the fourth projecting part 260 is disposed on another end surface of the L-shaped pattern plate 200, and the third projecting part 170 and the fourth projecting part 260 are arranged in opposite directions. When the T-shaped shear wall module 10 is spliced horizontally with other straight shear wall modules, the insertion is more reliable and not easy to disconnect. The present module can also be combined with a concrete shear wall to serve as a special-shaped buttress for reinforcement at the corner of the shear wall or at an intersection of the wall. Compared with the existing rectangular buttress products in a market, the present module takes up less indoor space. The module of the present application can be effectively combined with the straight pattern plate and is easy to schedule, and there is no need to produce a rectangular frame column pattern plate.

Optionally, as shown in FIGS. 1 and 3, an identification portion is disposed on the outer surface and proximate to the middle portion of the straight pattern plate 100, and a dove-tail groove on the middle position of the outer surface of the straight pattern plate 100 is filled to form the identification, in order to mark a product number, a company name, a telephone number, etc. A plurality of first dove-tail grooves 190 are arranged at intervals on the inner surface and the outer surface of the straight pattern plate 100, and opening edges and inner edges of the first dove-tail grooves 190 are all rounded edges. A plurality of second dove-tail grooves 280 are arranged at intervals on the inner side surfaces and outer side surfaces of the two L-shaped pattern plates 200, and opening edges and inner edges of the second dove-tail grooves 280 are all rounded edges. Both the first dove-tail groove 190 and the second dove-tail groove 280 are sloped, that is, the upper parts thereof are narrow, and the lower parts thereof are wide, so as to facilitate demolding in a workshop. The opening edges and the inner edges of the first dove-tail grooves 190 are all rounded edges. Optionally, an interval between two adjacent first dove-tail grooves 190 is 30 mm. An interval between two adjacent second dove-tail grooves 280 is 30 mm. Due to the arrangement of the first dove-tail grooves 190 and the second dove-tail grooves 280, the external coated anti-cracking mortar has a reliable mechanical engagement with the surfaces, thereby effectively preventing the externally coated anti-cracking mortar from falling. The internal poured concrete has a reliable mechanical engagement with the surfaces, and the concrete and EPS can function together, thus improving the bonding force of the anti-cracking mortar or the bonding force of the concrete combining with the EPS, preventing the module from being damaged due to the collisions of the sharp corners during transportation, and moreover, facilitating demolding and improving bonding forces.

Optionally, an inserting board is arranged in two oppositely disposed second dove-tail grooves 280 among the second dove-tail grooves 280 on the inner side surfaces of the two L-shaped pattern plates 200, and the inserting board divides the concreting cavity enclosed by the two L-shaped pattern plates 200 into a concrete concreting cavity and a silt concreting cavity. Concrete and silt are poured separately, which is more economical. A special-shaped column of any size can be formed. As shown in FIGS. 1 to 3, reinforced concrete can be poured inside the special-shaped column, and thermal insulation mortar or common mortar can be poured outside the areas divided by the inserting board, which can effectively reduce the cost of construction (the cost of construction of the mortar per cubic meter is about 40% of that of the concrete), guarantee safety, and ensure beams and columns not to be exposed.

Optionally, as shown in FIGS. 1 to 3, the connectors 300 each include a first connector 310 and a second connector 320. The first connector 310 and the second connector 320 are spaced and alternately arranged between the two L-shaped pattern plates 200, and the first connector 310 and the second connector 320 are spaced and alternately arranged between each of the L-shaped pattern plates 200 and the straight pattern plate 100. A height of the first connector 310 in the vertical direction is greater than a height of the second connector 320 in the vertical direction, and upper surfaces of the first connector 310 and the second connector 320 are located in the same horizontal plane, or lower surfaces of the first connector 310 and the second connector 320 are located in the same horizontal plane. Optionally, the height of the first connector 310 in the vertical direction is twice the height of the second connector 320 in the vertical direction. Along the length direction of the two L-shaped pattern plates 200, the first connector 310 and the second connector 320 are arranged to be staggered, which can guarantee the strength while effectively avoid the waste of materials to meet the requirements of uniformity and economy of the module. The sharp corners of the first connector 310 and the second connector 320 are chamfered to facilitate demolding. The staggered arrangement of the first connector 310 and the second connector 320 makes a center penetration portion of the module to be effectively strengthened. Compared with a serpentine penetration portion of the existing module in a market, a pull-beam-typed direct penetration portion bears forces directly. Moreover, the arrangement manner of the first connector 310 and the second connector 320 can increase the transportation efficiency by about 15%-20%.

Optionally, the upper surfaces of the first connector 310 and the second connector 320 are located in the same horizontal plane. The upper surfaces of the first connector 310 and the second connector 320 are both provided with a plurality of receiving grooves 330, and a reinforcing bar is arranged in each of the receiving grooves 330. Optionally, convex ribs 340 protruding upwards are arranged at intervals on the upper surfaces of the first connector 310 and the second connector 320, and the receiving groove 330 for receiving the reinforcing bar is formed between two adjacent convex ribs 340. Optionally, three receiving grooves 330 are provided on each of the surfaces of the first connector 310 and the second connector 320, and on the basis of requirements, one reinforcing bar can be arranged in a middle receiving groove, two reinforcing bars are arranged in the receiving groove at one side, and three bars arranged in the receiving groove at another side. In such an arrangement, not only can the strength of the shear wall be increased, but more importantly, reinforcing bars of different numbers can be arranged in each position according to requirements, to adjust the rigidity of the shear wall as required by construction. The convex ribs 340 will not weaken the cross sections of the first connector 310 and the second connector 320, nor will they cause defects on the upper surfaces of the first connector 310 and the second connector 320, thereby further preventing the connectors 300 from breaking, and making it convenient for an operator to assemble reinforcing bars without stretching out his/her hands too deep into the module. The arrangement of the connectors 300 makes vertical gaps in the concrete shear wall. After concrete is poured, only EPS but no concrete exists at locations where the connectors 300 are disposed. As the elastic modulus of the EPS is much greater than that of the concrete, and is equivalent to that of the concrete shear wall formed with gaps, the shear wall with vertical gaps has good integrity in an elastic range, has rigidity reduced little, and has better anti-shearing and bearing capacity than a conventional shear wall does.

Figure 4:
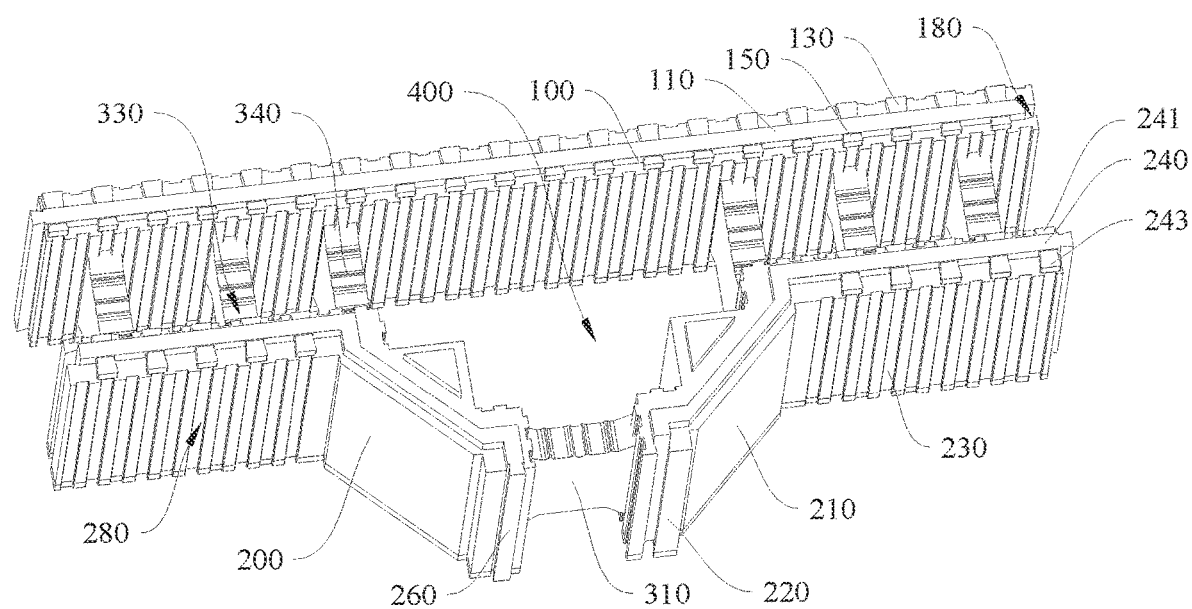
FIG. 4 is a schematic structure view of a first visual angle of the T-shaped shear wall module according to another embodiment of the present application.
Figure 5:
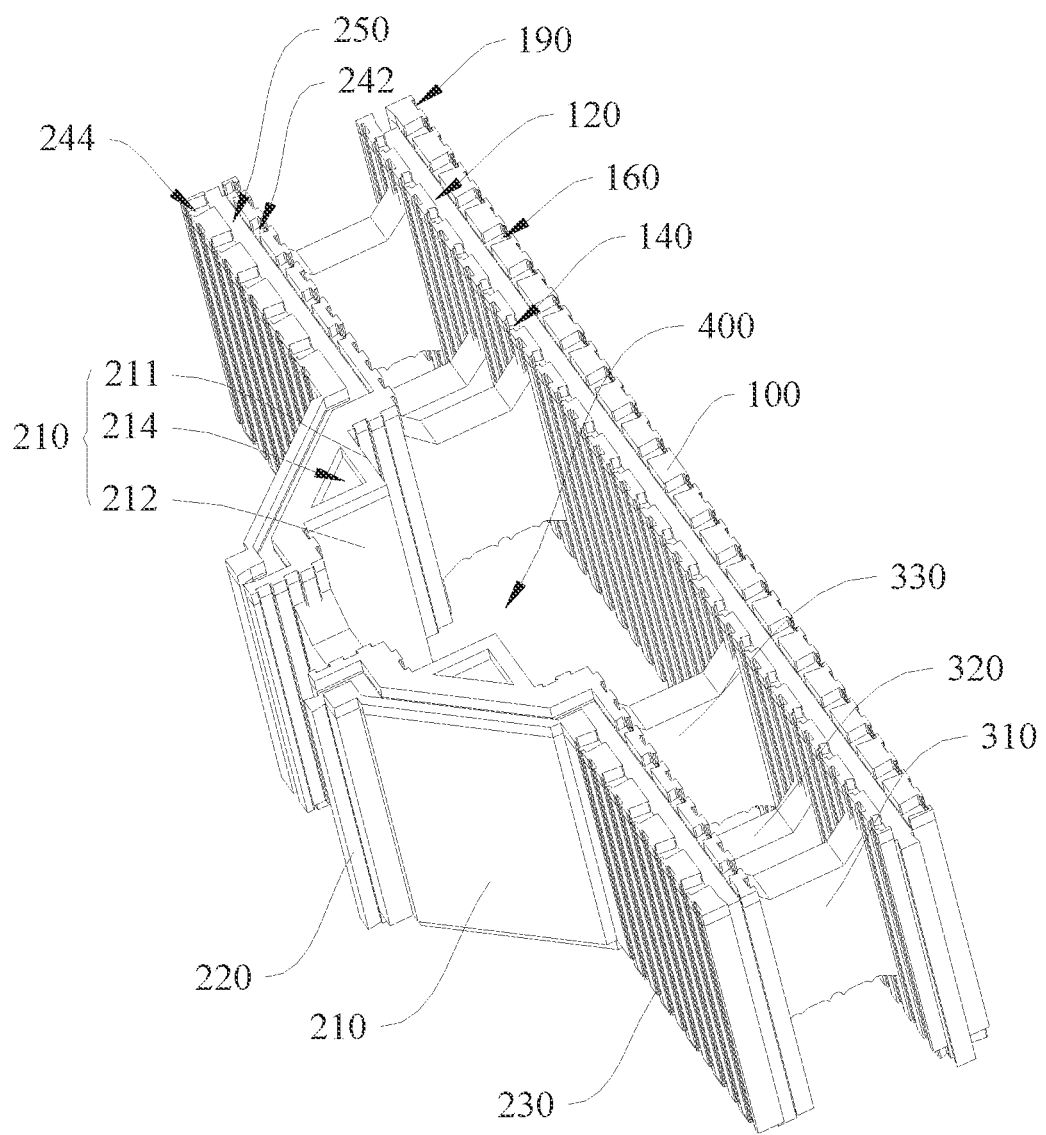
FIG. 5 is a schematic structure view of a second visual angle of the T-shaped shear wall module according to another embodiment of the present application.
Figure 6:
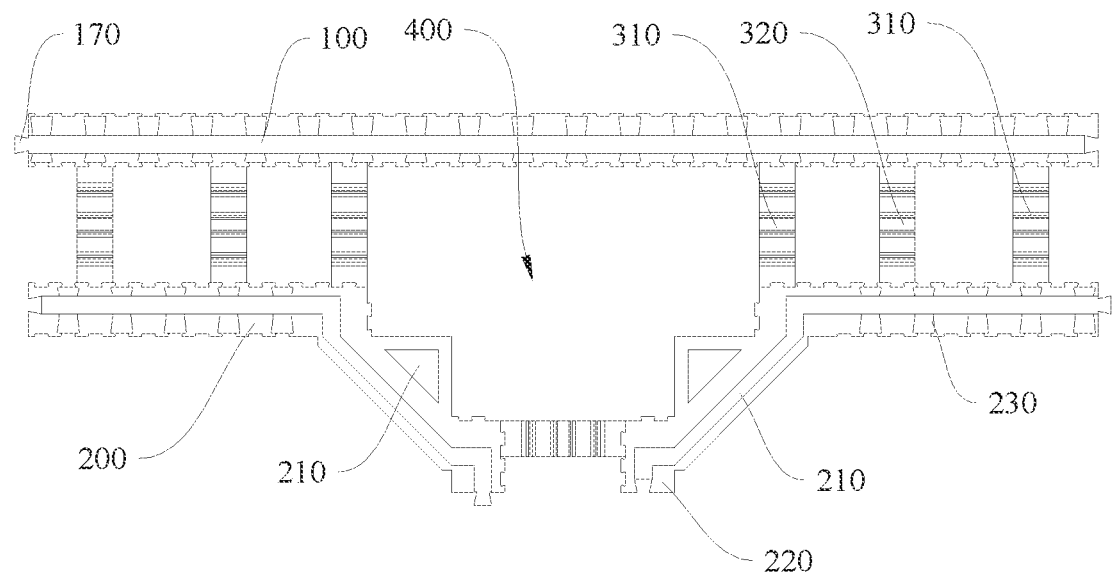
FIG. 6 is a top view of the T-shaped shear wall module according to another embodiment of the present application.

As shown in FIGS. 4 to 6, another embodiment of the present application provides a T-shaped shear wall module 10, which has the same structure as the T-shaped shear wall module 10 provided in the above-described embodiment, and is applicable to corners of different walls. As shown in FIG. 1 and FIG. 4, the differences therebetween are that a length of the first pattern plate 220 of the L-shaped module 200 of this embodiment is less than a length of the first pattern plate 220 of the above-described embodiment, and that a length of the second pattern plate 230 of the present embodiment is greater than a length of the second pattern plate 230 of the above-described embodiment.

An embodiment of the present application also provides a shear wall, which includes a plurality of T-shaped shear wall modules 10 in the above technical solution. The plurality of T-shaped shear wall modules 10 are vertically spliced to form a whole shear wall. In an actual construction process, a plurality of L-shaped shear wall modules 100 are assembled (via insertion up and down) to form a wall without a need to disassemble the modules, and concrete is poured into the wall to form a wall with certain strength, rigidity, and thermal insulation performance.

Figure 7:
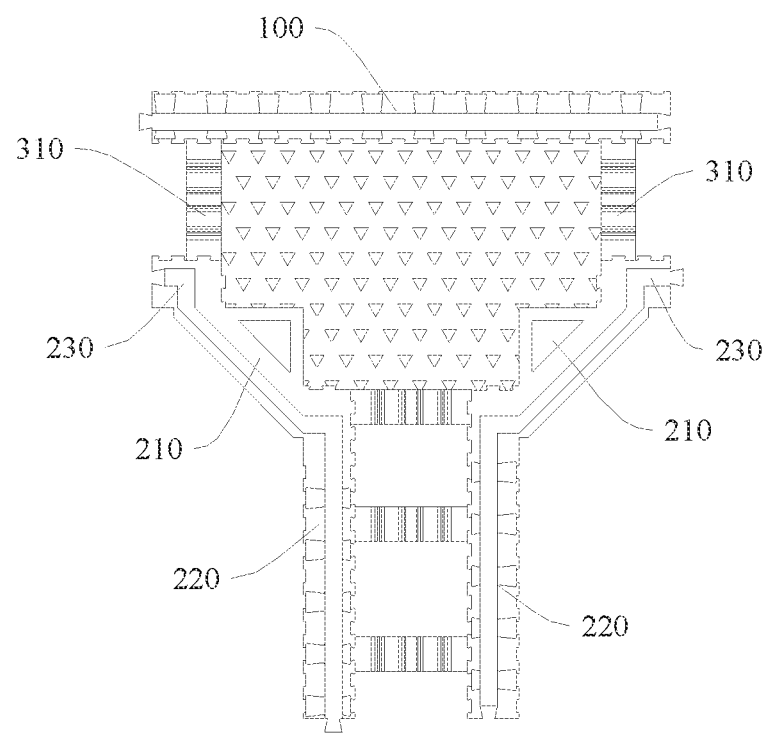
FIG. 7 is a top view of the T-shaped shear wall module poured with filler according to an embodiment of the present application.
Figure 8:
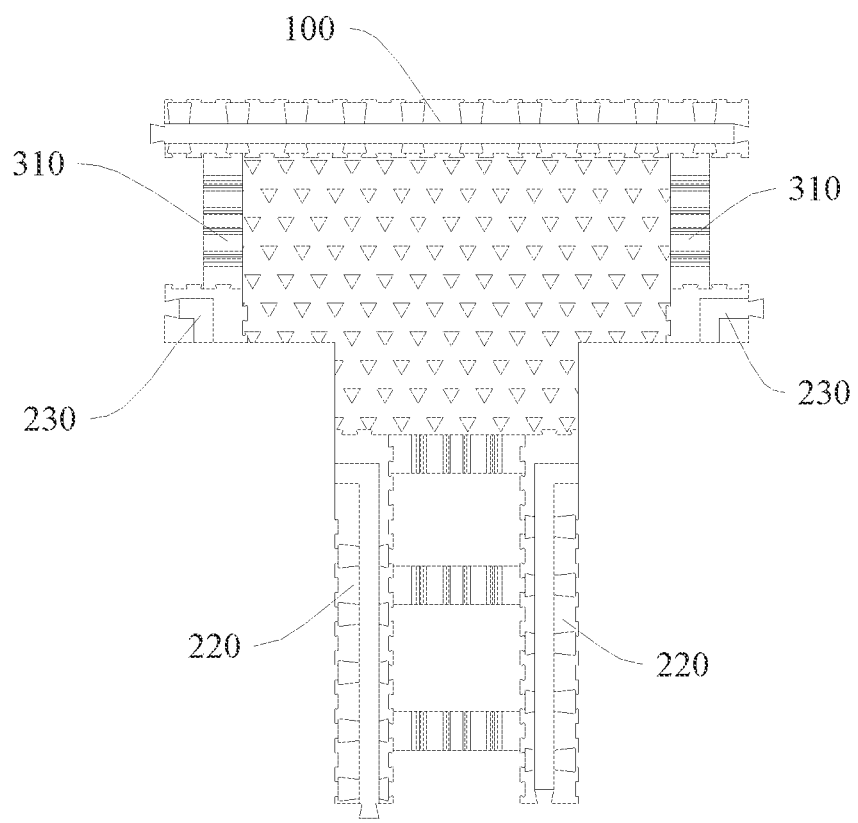
FIG. 8 is a top view of the T-shaped shear wall module without corner transition block according to an embodiment of the present application.
Figure 9:
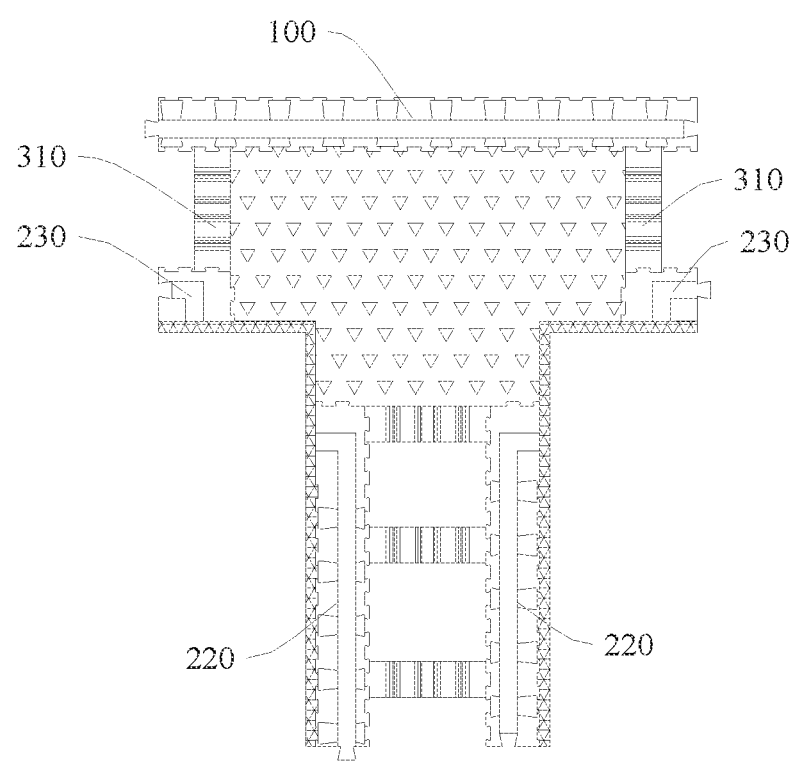
FIG. 9 is a top view of the T-shaped shear wall module coated with a coating layer according to an embodiment of the present application.
Figure 10:
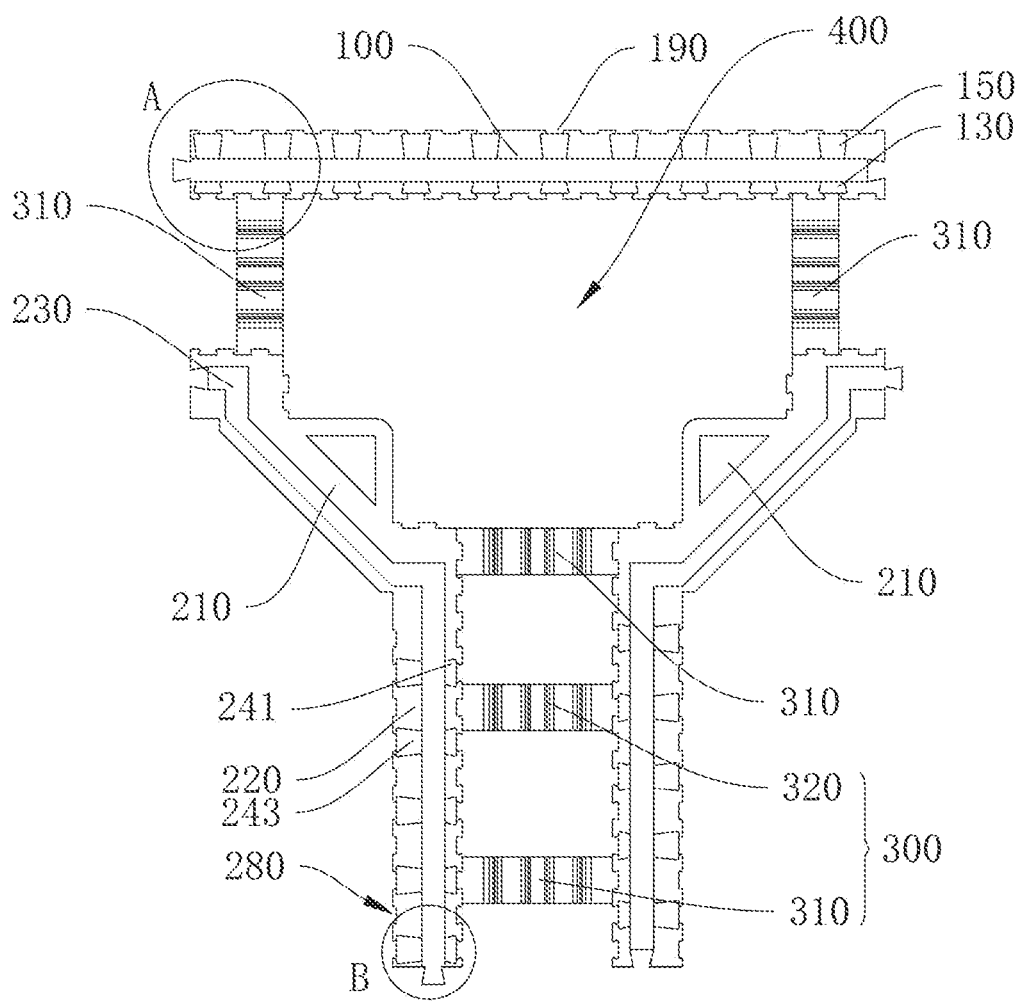
FIG. 10 is a top view of the T-shaped shear wall module coated with a coating layer according to another embodiment of the present application.
Figure 11:
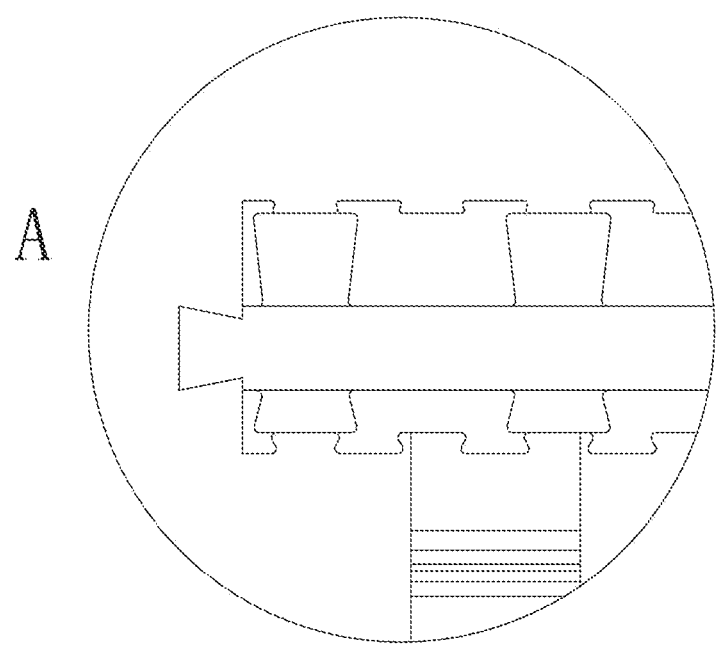
FIG. 11 is a partially enlarged view of a part A of FIG. 10.
Figure 12:
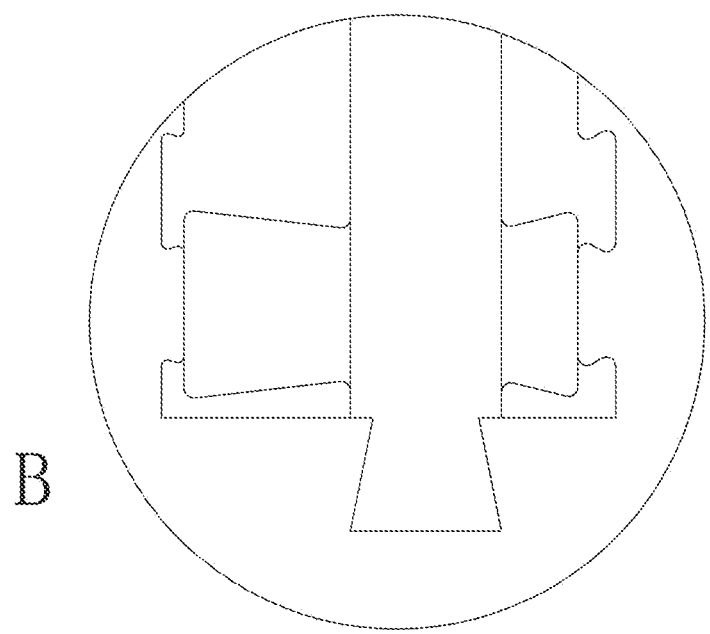
FIG. 12 is a partially enlarged view of a part B of FIG. 10.

Referring to FIGS. 7 to 9, an embodiment of the present application provides a construction method of a building shear wall, using the T-shaped shear wall module 10 as described in any one of the above technical solutions. Optionally, the materials of the straight pattern plate 100, the L-shaped pattern plates 200 and the connectors 300 are expanded polystyrene. The method includes the following steps.

A plurality of T-shaped shear wall modules 10 are spliced vertically to form the concreting cavity.

Filler is poured into the concreting cavity. As shown in FIG. 7, the filler can be concrete, mortar, etc.

After the filler solidifies, the corner transition block 210 at the corner of the L-shaped pattern plate 200 is removed to expose a surface layer of the filler in a right-angled or curved shape. Moreover, as shown in FIG. 8, two ends of the surface layer of the filler extend to the first pattern plate 220 and the second pattern plate 230 respectively.

A coating layer is coated on the exposed surface layer of the filler and the outer surfaces of the first pattern plate 220 and the second pattern plate 230. As shown in FIG. 9, the coating layer can be an anti-cracking mortar layer coated on the surface layer of the filler and the outer surfaces of the first pattern plate 220 and the second pattern plate 230. In the above-mentioned construction method of the building shear wall, when the filler such as concrete in the concreting cavity has solidified, the corner transition block 210 can be cut off, and the corner of the L-shaped inner pattern plate without the corner transition block is right-angled in shape to guarantee the strength of the corner and reduce the occupied indoor space as well.

In the above T-shaped shear wall module, the corner transition block is disposed at the corner of the L-shaped pattern plate; the corner transition block has a protruding surface that protrudes toward the straight pattern plate; and one end of the protruding surface extends to the outer side surface of the first pattern plate, and the other end of the protruding surface extends to the outer side surface of the second pattern plate. The two protruding surfaces and the inner surface of the straight pattern plate jointly enclose the concreting cavity for pouring concrete, which effectively increases the cross-sectional area of the concreting cavity at the corners of the T-shaped shear wall module, improves the strength and the load-bearing capacity of the corners of the T-shaped shear wall module, and enhances the firmness of the wall. In addition, when the concrete in the concreting cavity has solidified, the corner transition blocks of the L-shaped pattern plate can be cut off. After the corner transition blocks are cut off, the corners of the two L-shaped pattern plates with the same structure are right-angled in shape, thereby guaranteeing the strength at the corners and reducing the occupied indoor space as well.

The technical features of the above-described embodiments may be arbitrarily combined. For the sake of brevity of description, not all possible combinations of the various technical features in the above embodiments are described. However, as long as there is no contradiction between the combinations of these technical features, all should be considered within the scope of the disclosure.

What described above are several embodiments of the present application, and these embodiments are specific and in details, but not intended to limit the scope of the present application. It should be understood by the skilled in the art that various modifications and improvements can be made without departing from the scope of the present application. Therefore, the scope of the present disclosure is defined by the appended claims.

What is claimed is:

1. A T-shaped shear wall module, comprising:
a straight pattern plate, two L-shaped pattern plates with a same structure, and connectors;
wherein each of the two L-shaped pattern plates comprises a first pattern plate and a second pattern plate perpendicular to each other;
in a direction perpendicular to the straight pattern plate, the two first pattern plates are arranged in parallel to each other and both extend in a direction away from the straight pattern plate, and a plurality of the connectors are rigidly arranged between the two first pattern plates;
along a direction parallel to the straight pattern plate, the two second pattern plates are coplanar and extend in opposite directions, and another plurality of the connectors are rigidly arranged between the straight pattern plate and the two second pattern plates;
a corner transition block is disposed at a corner of each of the two L-shaped pattern plates and capable of being cut off, the corner transition block has a protruding surface protruding towards the straight pattern plate; a first end of the protruding surface extends to an outer side surface of the first pattern plate; and a second end of the protruding surface extends to an outer side surface of the second pattern plate;
the corner transition block comprises a first side surface and a second side surface perpendicular to each other, the first side surface is rigidly connected to the first pattern plate, and the second side surface is rigidly connected to the second pattern plate, the outer side surface of the first pattern plate and the first side surface are coplanar and the outer side surface of the second pattern plate and the second side surface are coplanar;
a side edge at an intersection between the first side surface and the second side surface is a rounded edge;
the connectors each comprise a first connector and a second connector;
the first connectors and the second connectors are arranged between the two L-shaped pattern plates, and the first connectors and the second connectors are arranged between the L-shaped pattern plates and the straight pattern plate, each two adjacent of the first connectors are spaced by one of the second connectors, and each two adjacent of the second connectors are spaced by one of the first connectors;
a height of each first connector in a vertical direction is greater than a height of each second connector in the vertical direction; and
upper surfaces of the first connectors and the second connectors are located in a same horizontal plane, or lower surfaces of the first connectors and the second connectors are located in a same horizontal plane.

2. The T-shaped shear wall module of claim 1, wherein a protruding block is provided on a top surface of the corner transition block, and a groove matching the protruding block is disposed on a bottom of the corner transition block.

3. The T-shaped shear wall module of claim 1, wherein a first projecting part is provided on a top of the straight pattern plate; a plurality of first inner protrusions are arranged at an inner side of the first projecting part; a plurality of first outer protrusions are arranged at an outer side of the first projecting part;
a first groove matching the first projecting part, a plurality of first inner grooves matching the first inner protrusions, and a plurality of first outer grooves matching the first outer protrusions are disposed on a bottom of the straight pattern plate;
a height of the first projecting part is greater than a height of each of the first inner protrusions, and greater than a height of each of the first outer protrusions;
a second projecting part is provided on a top of the L-shaped pattern plate; a plurality of second inner protrusions are arranged at an inner side of the second projecting part; a plurality of second outer protrusions are arranged at an outer side of the second projecting part;
a second groove matching the second projecting part, second inner grooves matching the second inner protrusions, second outer grooves matching the second outer protrusions are disposed on a bottom of each L-shaped pattern plate; and a height of the second projecting part is greater than a height of each of the second inner protrusions, and greater than a height of each of the second outer protrusions.

4. The T-shaped shear wall module of claim 3, wherein the first inner protrusions and the first outer protrusions are arranged to be directly opposite one to one or staggered at two sides of the first projecting part; and the second inner protrusions and the second outer protrusions are arranged to be directly opposite one to one or staggered at two sides of the second projecting part.

5. The T-shaped shear wall module of claim 4, wherein the first inner protrusions and the first outer protrusions are arranged to be directly opposite one to one, and have a same first height; and the second inner protrusions and the second outer protrusions are arranged to be directly opposite one to one and have a same second height.

6. The T-shaped shear wall module of claim 5, wherein a difference between the height of the first projecting part and the height of each of the first inner protrusions ranges from 3 mm to 6 mm;

a difference between the height of the second projecting part and the height of each of the second inner protrusions ranges from 3 mm to 6 mm;

an interval between two adjacent first inner protrusions ranges from 55 mm to 65 mm; and an interval between two adjacent second inner protrusions ranges from 55 mm to 65 mm.

7. The T-shaped shear wall module of claim 3, wherein cross sections of the first inner protrusions, the first outer protrusions, the second inner protrusions, and the second outer protrusion are all trapezoidal in shape, and edges in vertical direction of the first inner protrusions, the first outer protrusions, the second inner protrusions, and the second outer protrusions are all rounded edges.

8. The T-shaped shear wall module of claim 3, wherein H1 denotes a distance between an inner side surface of the first projecting part and an inner surface of the straight pattern plate, and H2 denotes a distance between an outer side surface of the first projecting part and an outer surface of the straight pattern plate, H1<H2;

H3 denotes a distance between an inner side surface of the second projecting part and an inner side surface of the L-shaped pattern plate, and H4 denotes a distance between an outer side surface of the second projecting part and an outer side surface of the L-shaped pattern plate, H3<H4.

9. The T-shaped shear wall module of claim 8, wherein H1 is in a range from 13 mm to 17 mm; H2 is in a range from 23 mm to 27 mm; H3 is in a range from 13 mm to 17 mm; and H4 is in a range from 23 mm to 27 mm.

10. The T-shaped shear wall module of claim 1, wherein a third projecting part protruding outward is provided on a first end surface of the straight pattern plate, and a cross section of the third projecting part is trumpet-shaped; a third groove matching the third projecting part is disposed on a second end surface of the straight pattern plate;

a fourth projecting part protruding outward is provided on a first end surface of the L-shaped pattern plate; a cross section of the fourth projecting part is trumpet-shaped; and a fourth groove matching the fourth projecting part is disposed on a second end surface of the L-shaped pattern plate.

11. The T-shaped shear wall module of claim 1, wherein a plurality of first dove-tail grooves are arranged at intervals on an inner surface and an outer surface of the straight pattern plate, and opening edges and inner edges of the first dove-tail grooves are all rounded edges;

a plurality of second dove-tail grooves are arranged at intervals on inner side surfaces and outer side surfaces of the two L-shaped pattern plates, and opening edges and inner edges of the second dove-tail grooves are all rounded edges.

12. The T-shaped shear wall module of claim 1, wherein the height of the first connector in the vertical direction is twice the height of the second connector in the vertical direction.

13. The T-shaped shear wall module of claim 12, wherein the upper surfaces of the first connectors and the second connectors are located in the same horizontal plane; a plurality of receiving grooves are located on the upper surfaces of the first connectors.

14. The T-shaped shear wall module of claim 13, wherein convex ribs protruding upwards are arranged at intervals on the upper surfaces of the first connectors and the second connectors, and each of the receiving grooves for receiving the reinforcing bar is formed between two adjacent convex ribs.

* * * * *